United States Patent
Tollefson

(10) Patent No.: US 7,498,513 B2
(45) Date of Patent: Mar. 3, 2009

(54) TOOLBOX WITH RETRACTABLE CABLE AND LATCH

(75) Inventor: Dale Anton Tollefson, Brush Prairie, WA (US)

(73) Assignee: Peak Recreational Products, LLC, Brush Prairie, WA (US)

( * ) Notice: Subject to any disclaimer, the term of this patent is extended or adjusted under 35 U.S.C. 154(b) by 16 days.

(21) Appl. No.: 11/623,320

(22) Filed: Jan. 16, 2007

(65) Prior Publication Data
US 2008/0047728 A1   Feb. 28, 2008

Related U.S. Application Data

(63) Continuation-in-part of application No. 11/467,513, filed on Aug. 25, 2006, now Pat. No. 7,164,081.

(51) Int. Cl.
*H02G 3/08* (2006.01)

(52) U.S. Cl. ............... 174/50; 174/58; 174/59; 439/535; 439/501; 248/906

(58) Field of Classification Search ............ 174/50, 174/58, 59; 439/501, 535, 652, 445, 369; 248/906; 191/12.4, 12.2; 70/30, 49, 8, 233
See application file for complete search history.

(56) References Cited

U.S. PATENT DOCUMENTS

| | | | | |
|---|---|---|---|---|
| 4,098,099 A * | 7/1978 | Smith | ............................ | 70/18 |
| 5,669,571 A * | 9/1997 | Graybill | .................. | 424/378.1 |
| 6,619,980 B1 * | 9/2003 | Hsiao | .......................... | 439/501 |
| 6,909,046 B2 * | 6/2005 | Laity et al. | ..................... | 174/50 |
| 7,000,746 B2 * | 2/2006 | Mackin et al. | ............. | 191/12.4 |
| 7,108,544 B2 * | 9/2006 | Zoller | ......................... | 439/501 |

* cited by examiner

*Primary Examiner*—Dhiru R Patel
(74) *Attorney, Agent, or Firm*—Fields IP, PS

(57) ABSTRACT

A storage box includes a plurality of walls that define an interior. A cable housing may be secured to an interior wall of the storage box, with a reel secured therein for rotational winding and unwinding of a cable. A cable retention knob on the distal end of the cable enables withdrawal of the cable external the storage box. A receiving port on a wall of the storage box can receive at least a portion of the cable retention knob. A latch assembly is operatively disposed proximate the receiving port and is selectively configurable, dependent on an open or close condition of a lid. The latch assembly is operatively and selectively configured to release the cable retention knob when the lid is open and to enable spring-biased capture of the cable retention knob when the lid is closed and when the cable retention knob is seated in the receiving port.

20 Claims, 9 Drawing Sheets

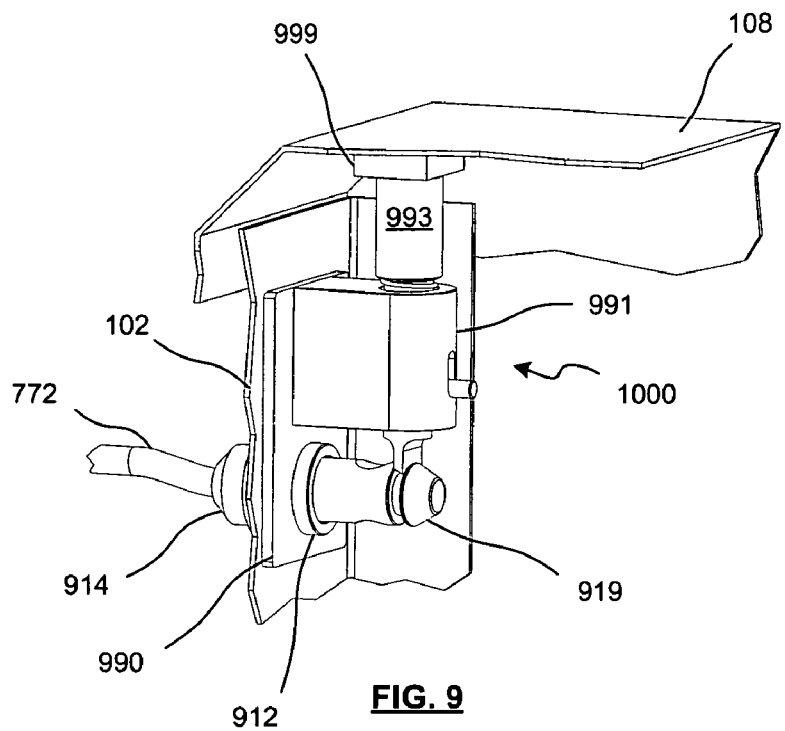
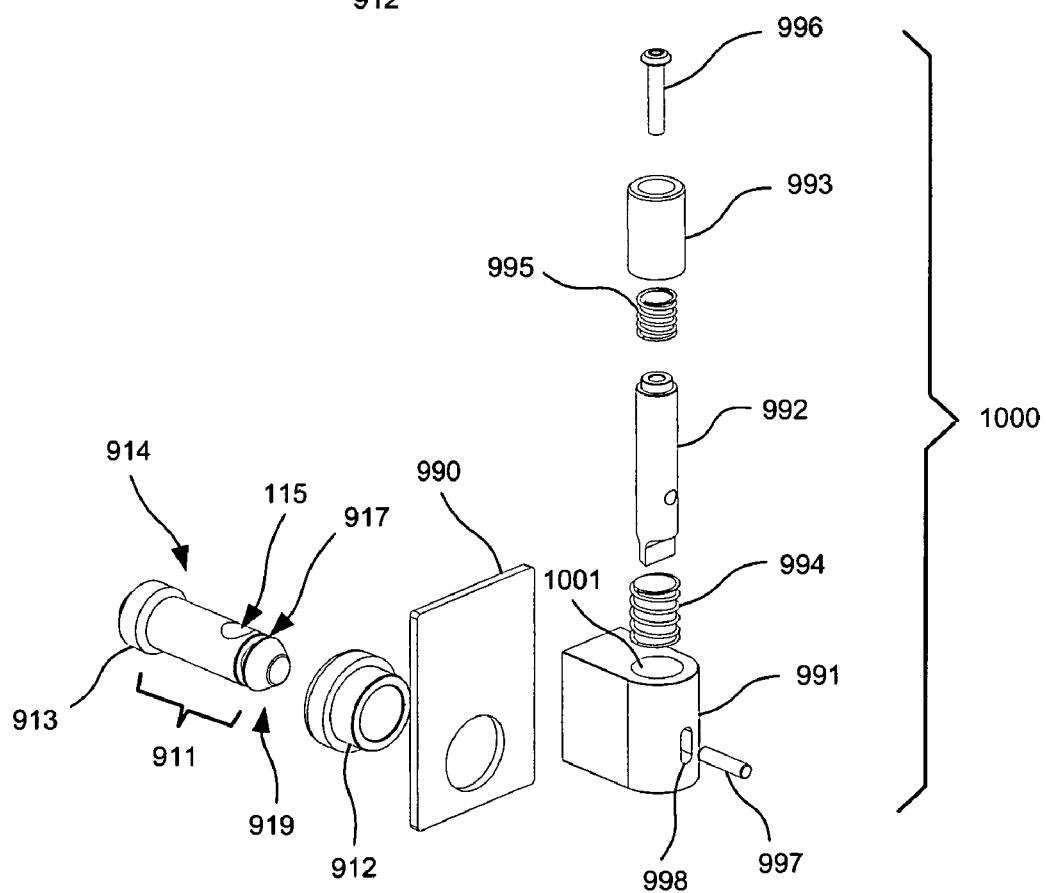
FIG. 9
FIG. 10

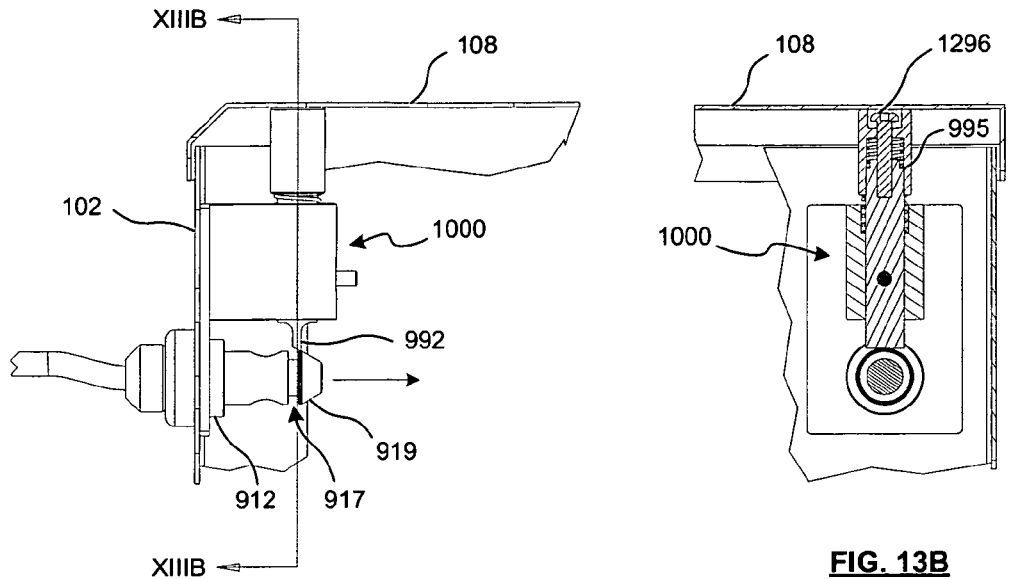
FIG. 13A
FIG. 13B
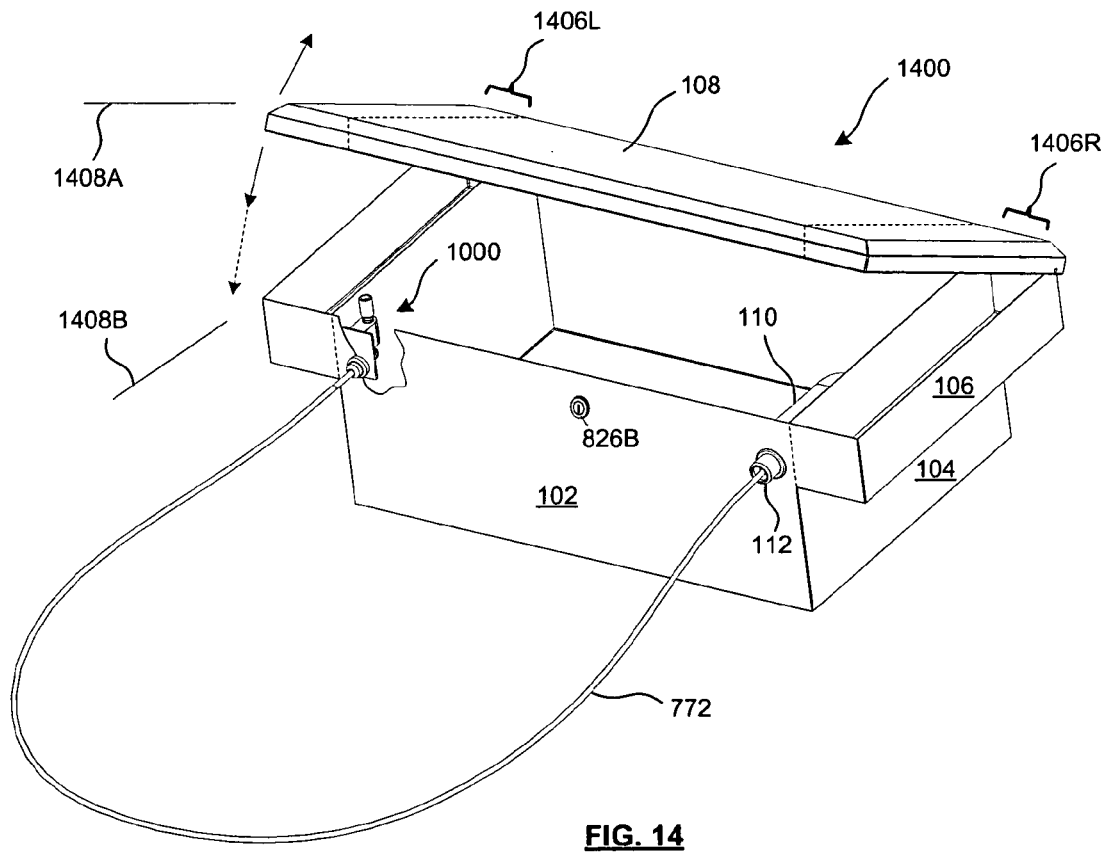
FIG. 14

TOOLBOX WITH RETRACTABLE CABLE AND LATCH

RELATED APPLICATION

This application claims priority and benefit as a continuation-in-part of U.S. patent application Ser. No. 11/467,513, filed Aug. 25, 2006, to issue as U.S. Pat. No. 7,164,081, hereby incorporated by reference in its entirety.

TECHNICAL FIELD

The present disclosure relates to toolboxes and, more particularly, to toolboxes formed with a retractable cable securement assembly. In some embodiments, the toolbox may be defined by a cabinet structure and/or structure operable for mounting across the bed of a pickup truck.

BACKGROUND

Toolboxes are generally known to be formed in a variety of configurations, which may provide internal compartments accessible by a user for retrieval, return and storage of tools. Some known embodiments for the toolbox may be mounted across a truck bed behind the cab of a pickup truck, from which tools may be frequently removed and returned by the user while working alongside the truck at a remote setting. Other embodiments for the toolbox may comprise a cabinet structure of a substantially fixed or roll away configuration, from which tools may be removed and returned by the user while working in proximity of the toolbox, for example, within a garage or workshop.

In some cases, a user may have more cumbersome tools or equipment that may not be capable of ready stowage within the toolbox. The user may further find an occasional need for temporary leave from the job. Cables and locks might generally be known for assisting the user in security of the cumbersome tools and equipment. For example, a cable or chain of given length may be wound about/through the tools and equipment, or other personal property, and interlocked together in association with a large object to deter theft of the tools or equipment during the user's temporary departure.

In some circumstances, however, it may become difficult to find a large object to which the chain or cable may be interlocked, the cable may be lost, or it may be awkward to handle the chain or cable when wrapping it about the equipment together with the large object.

SUMMARY

In accordance with an embodiment of the present invention, a storage box comprises a plurality of walls for defining in part an interior for storing tools or other user implements. An exit aperture and receiving port may be defined in at least one of the wails of the plurality. A reel may be disposed within the interior and operable for axial rotation. A first end of a cable may be secured to the reel, and the second end of the cable may be fixed to a cable retention knob. A latch assembly may be disposed in proximity to the receiving port and may be operable dependent upon an open or closed condition of a lid to the storage box for effecting either release or capture operability of the latch.

In a further embodiment, an actuator may be operable between the lid and latch to affect the latch release or capture operability based upon the open or closed condition of the lid.

In yet a further embodiment, the actuator may comprise a plunging rod operable with a downward longitudinal displacement when the lid is closed for positioning at least a portion of the latch for partial spring-biased interference into a path defined by an inner diameter of the receiving port. A plunger lift spring as a further part of the actuator may be operable to mechanically bias the plunging rod, when the plunging rod has been displaced downward so as to lend a lifting force operable to lift the plunging rod when the lid is opened for clearing the latch from the path as defined by the inner diameter of the receiving port.

In yet a further embodiment, an alignment unit comprising at least one of a block or bracket may be fixed to an inner surface of a sidewall of the storage box, for defining a bore in proximity for coaxially receiving and guiding the latch pin for longitudinal movement relative to the receiving port.

In another embodiment, a toolbox may comprise a plurality of walls for defining an interior for storage of tools. A lid may be operable for hinged open and close movement about an edge of a back sidewall of the plurality of walls. A retractable cable sub-assembly may be disposed within the interior with a length of cable capable of being retracted or retrieved from or by the retractable cable sub-assembly An exit aperture may be defined through a wall of the plurality and operable to enable passage of the cable therethrough during extraction or rewind of the cable A receiving port may also be defined through a wall of the plurality and may be operable to receive at least a portion of a cable retention knob disposed on the end of the cable. A latch assembly may be disposed In operable proximity of the receiving port to enable, under the influence of an actuator and dependent on the open or close position of the lid, to selectively configure the latch assembly for release operability when the lid is open or capture operability with the lid is closed.

BRIEF DESCRIPTION OF THE DRAWINGS

The subject matter of embodiments of the present invention may be understood by reference to the following detailed description and with reference to the accompanying drawings. In which:

FIG. 9 is a simplified cut-away and isometric view of a latch assembly proximate a receiving port as driven by an actuator dependent on the closed condition of a lid to a storage box, in accordance with an embodiment of the invention.

FIG. 10 is a simplified isometric assembly view of a latch assembly for use in a storage box in accordance with an embodiment of the present invention.

FIGS. 13A and 13B are simplified side and cross-section cutaway views of a latch assembly in a storage box, in accordance with an embodiment of the present invention, showing an operability of the latch when the lid in an closed condition and during insertion of a cable retention knob into a receiving port.

FIG. 14 is a simplified perspective view of a storage box having a retractable cable sub-assembly disposed within the interior and a latch assembly in proximity to a receiving port for operability dependent upon the open/closed position of the lid, in accordance with an embodiment of the present invention, and showing the lid of the storage box in an open condition.

DETAILED DESCRIPTION

Figure 1:
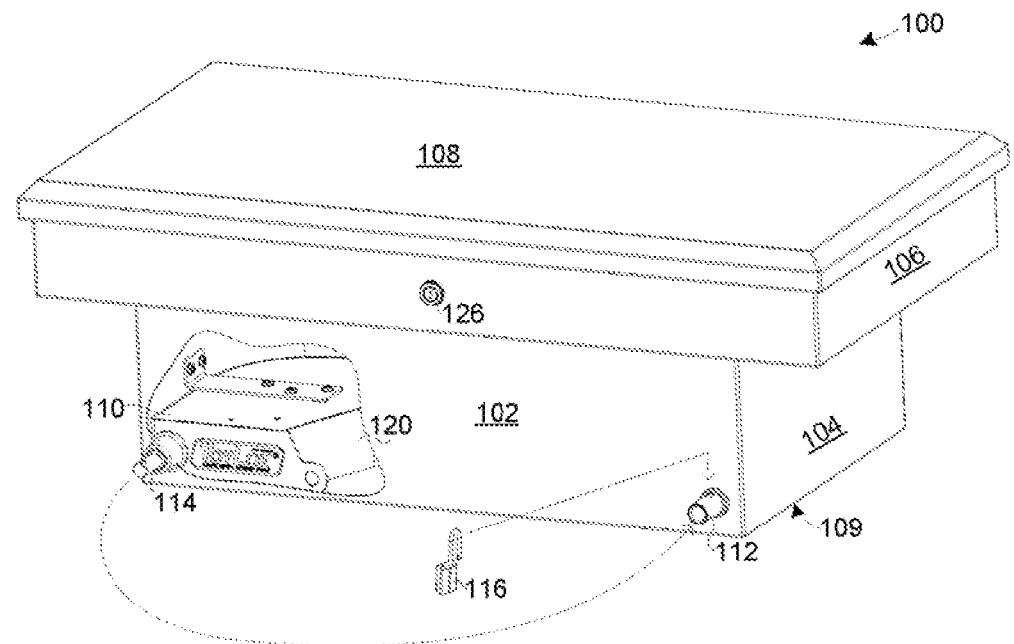
FIG. 1 is a simplified perspective view of a toolbox, consistent with an embodiment of the present invention, configured to assist installation across the bed of a pickup truck.

While the invention is amenable to various modifications and alternative forms, specifics of particular embodiments are presented by way of example in the drawings. It should be understood, however, that the intent is not necessarily to limit the invention to the particular embodiments described. On the contrary, the intent is to cover all modifications, equivalents, and alternatives falling within the spirit and scope of the invention as defined by the appended claims.

In the description that follows, readily established structures for the embodiments of the present invention may be disclosed in simplified form (e.g., simplified structures of cabinets, frames, drawers, housing, ratchet members, cable ends, brackets, grommets, etc.) to avoid obscuring an understanding of the embodiments with excess detail and where persons of ordinary skill in this art can readily understand their operative structure by way of the drawings and disclosure. Likewise, identical components may be given the same reference numerals, regardless of whether they are shown in different embodiments of the invention. Further, it may be understood that the illustrated depictions for particular embodiments may not necessarily be drawn to scale.

In accordance with an embodiment of the present invention, referencing FIG. 1, toolbox 100 may comprise a plurality of walls that, define at least in part an interior that may be available for access by a user for storage, retrieval and return of tools. For example, the plurality of walls may include right and left sidewalls 104 which may be disposed across and opposite one another on opposite ends of the longitudinal box. Front and back sidewalls 102 of the toolbox may be disposed across the width of the toolbox along its longitudinal length. A width and a length for the interior compartment for the toolbox may be defined by these sidewalls. Floor 109 may be joined to the base of the sidewalls and extend therebetween. In a particular example, toolbox 100 may further comprise shoulders 106 configured as portions to sidewalls 104. The shoulders 106 may extend outwardly beyond the lower extents of the left and right sidewalls 104 and be operable to overlap sidewalls of a truck bed to a truck.

It may be understood, in certain embodiments, that toolbox 100 may be described more generally with floor 109 joined to sidewalls 102,104 along peripheral edges thereof, effective, to form at least in part an enclosure or compartment. In one embodiment, the walls may be constructed with sheet metal. In another embodiment, the walls may be constructed with plastic. Further, they may include known reinforcement ribs to improve structural integrity. Additionally, it may be understood that toolbox 100 may further comprise a lid 108 of known configuration. Hinges as known may serve as pivotal joints by which the lid may be rotatably secured to at least a portion of a side wall, known key-locking provisions 126 may be integrated together with the lid for enabling keyed or otherwise locked securement of the lid over the toolbox.

Further referencing FIG. 1, the toolbox may further comprise a retractable cable securement sub-assembly 110 fixed to at least one of the sidewalls that define the interior for the toolbox. In a particular example, the sub-assembly 110 may comprise a housing 120 with a reel secured for axial rotation therein. A cable may be secured to the reel and a retention knob may be fixed to a distal end of the cable opposite the reel. The reel may be operable to enable retractable winding/unwinding of the cable about a given circumference of the reel.

The cable housing with the reel may be fixed to at least one of the interior walls for the interior of the toolbox. The cable housing may be positioned for placement of the distal end of the cable relative to an aperture in the front wall 102 of the toolbox operable, to enable substantially free passage of the cable through the aperture during retraction or rewind of the cable from/within the cable housing. Further, a spring may be configured to apply a rotational force to the reel for enabling tensioned winding and unwinding of the cable onto/from the reel.

Figure 2:
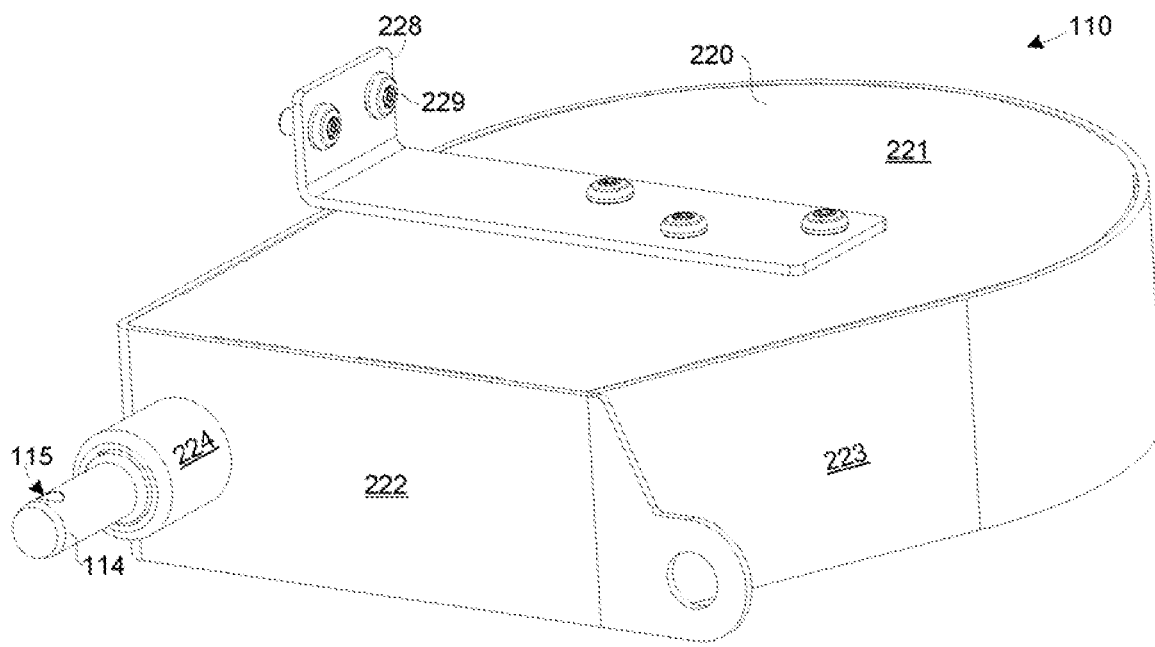
FIG. 2 is a simplified perspective view of a securement sub-assembly for the toolbox of FIG. 1 consistent with an embodiment of the present invention.
Figure 3:
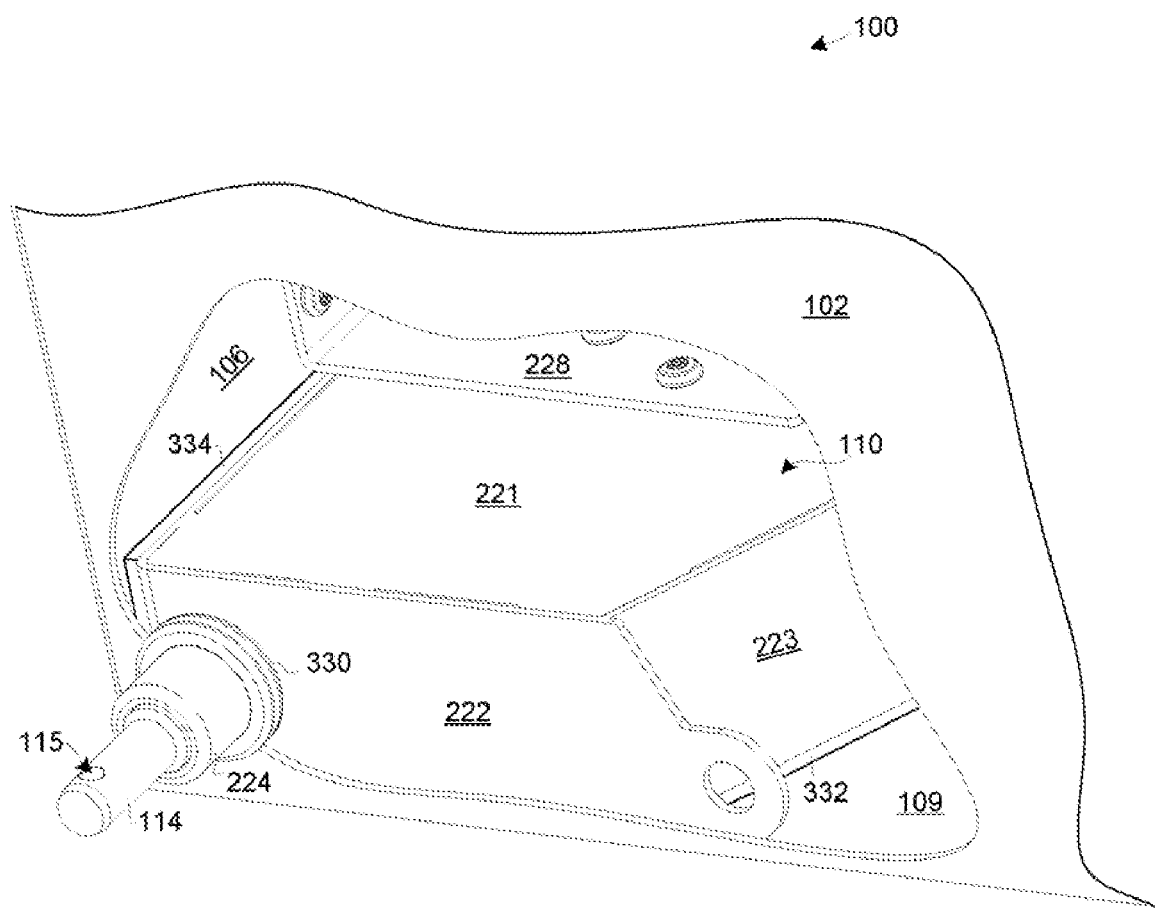
FIG. 3 is a simplified perspective and partial cut-away view of a portion of the toolbox, consistent with embodiments of the present invention, showing a bushing through which the cable is threaded and also resilient padding between the cable housing and the inner walls for the toolbox interior.
Figure 4:
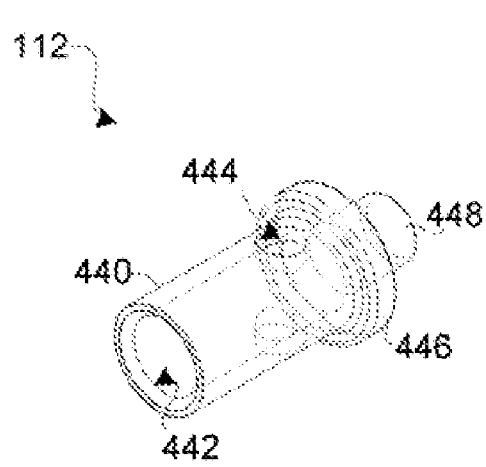
FIG. 4 is a simplified perspective view of a hollowed securement member for the toolbox of FIG. 1, in accordance with an embodiment of the present invention.
Figure 5:
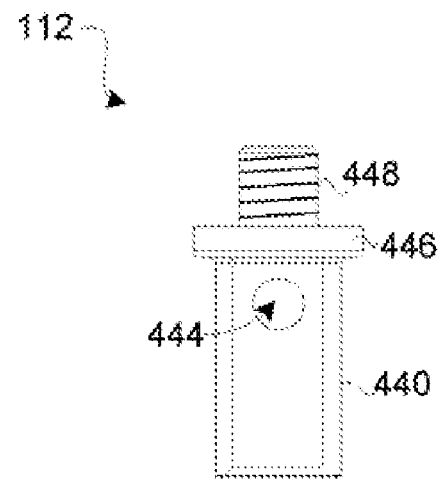
FIGS. 5 and 6 provide simplified top and side views for the securement member of FIG. 4.
Figure 6:
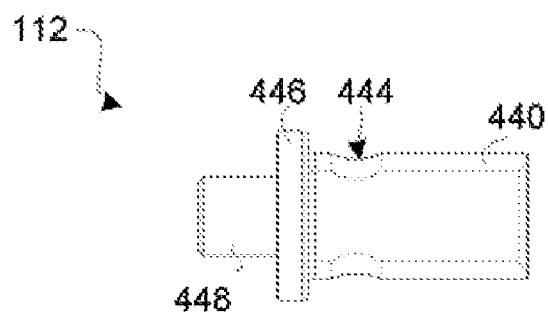

Further referencing FIG. 1 in combination with FIGS. 2 and 3, the toolbox may further comprise mounts for fixing the cable housing 220 of the securement sub-assembly 110 to at least one of the sidewalls 102,104,109 associated with defining the interior of the toolbox. For example, cable housing 110 may be secured to a left sidewall 104 of the toolbox by brackets 228 and fasteners 229. The bracket of one embodiment may physically secure a portion (top wall 221) of cable housing 220 relative to an interior (left) sidewall 106 for the toolbox compartment In further embodiments, the fasteners for securing the cable housing may comprise metal or synthetically weld joints, calking materials and/or compressive pad/adhesives to physically interface the cable housing with the interior walls for the toolbox.

In a further embodiment, a bushing 224 may be formed integrally with cable housing 220 to define a passage of given diameter and length through at least one of the aperture to a front wall 102 of the toolbox and a front wall 222 for cable housing 220. The retractable cable of the securement assembly 110 may be threaded through the passage that is defined by bushing 224.

In one embodiment, the cable may comprise a cross-sectional diameter that is sufficiently less than that of the passage to permit substantially free passage of the cable when it is presented with an angular alignment relative to the central axis of the passage of magnitude of less than about 5 degrees. Further, the length of the passage and the coefficient of friction between the surface of the cable relative to the interior surface of the bushing may be cooperative together per the limited clearance of the cable for enabling formation of a resistance force upon the cable that may be greater than a take-up or winding force deliverable thereto by the spring-loaded reel when a given length of the cable should be released external the toolbox during a rewind process.

In a further example, again referencing FIG. 3, the external surface of the bushing may be described as forming a neck disposed co-axially through the aperture formed or defined by front wall 102 for the toolbox. A grommet 330 may be disposed as known within the aperture operable to provide a compressive, resilient and/or sealed fit between the neck of the bushing and the annular edge of the wall that defines the aperture.

In a yet further embodiment, further referencing FIGS. 2-3, cable housing 220 defined at least in part by walls 221, 222, 223 may be supported relative to the interior surfaces of, for example, floor 109 and sidewall 106 of the toolbox interior by way of resilient foam or padding 332. For example, foam padding 332 may be disposed (e.g., with adhesive) against, floor 109 of the toolbox interior. A bracket fastening element 228 in combination with spot welds, rivets, screws 229 may be defined to fix a position of the cable housing 220 for a slight compressive bias against the resilient foam/padding 332, Additionally, foam padding 334 might also be disposed between a left sidewall of the cable housing for similar compressive biasing against the left sidewall 106 for the toolbox interior, likewise, similar padding (not shown) may be provided between the front-wall 222 of the cable housing and the front-wall 102 for the toolbox interior. The form padding may be obtained as known operable to dampen vibrations, rattling or knocking of the cable housing relative to the interior sidewalls of the toolbox, e.g., as may occur during travel of the toolbox such as, within the bed of a pick-up truck in travel.

Moving forward with reference to FIGS. 1-3 and 7B, the cable retention knob 114 at the distal end of the cable may comprise a butt, end joined to the distal end of the cable and a cylindrical member that is formed in integral relationship relative to the butt-end. The profile of the butt-end may be configured to seat in non-binding engagement with a cylindrical opening formed at the entry or exit of bushing 224 that is associated with the passage. Additionally, a hole 115 may be formed perpendicularly through at least a portion of the width of the cylindrical member.

Referencing FIGS. 1 and 4-6, in further embodiments, a knob securement member 112 may be fixed to an exterior wall of the toolbox. The knob securement member 112 may include inwardly facing cylindrical walls 442 that may define a cylindrical hollow of diameter capable of coaxially receiving the cylindrical member 114 of the cable retention knob. The knob securement member 112 may further be formed with a perpendicular opening 444, which may allow communication through and across a diameter of the cylindrical hollow. When aligned with the bored hole of the cable retention knob, the opening 444 of the securement member 112 may receive a shaft of a locking member such as a padlock (116 of FIG. 1) that may also be passed through the aligned openings of the securement knob for enabling an inter-locked securement.

In a particular embodiment, the securement member 113 may be welded to the external wail 102 of the toolbox. Alternatively, an aperture may be formed through the exterior wall 102, and a threaded neck 448 (FIGS 4-6) of the securement member may be passed through the aperture for known fastening elements (nut and washer, snap-ring or other fixed capture member).

Above, a cylindrical shaft 114 has been characterized for the cable retention knob, and a cylindrical hollow described for the securement member 112. In other embodiments, alternative cross-sections may be realized for the cable retention knob 114 and securement member 112. For example, the cable retention knob may be formed with a square or rectangular cross-section and the securement member may be formed with a hollow of similar cross-section operable to receive and/or seat the shape of the knob Moving forward with reference to FIGS. 7A-7C, in a particular embodiment, the retractable cable securement assembly 110 may comprise housing 220 defined by a plurality of walls 221, 222, 223. A reel 771 may be fixed for rotational operation within the housing. A cable 772 may have one end anchored to reel 771, while the distal end of the cable may be threaded through bushing 224 for accessibility external the housing The passage defined by the bushing may comprise a diameter and length operable in combination with the cable to enable formation of a resistive force thereto when a given length of the cable is released external the housing. The resistive force may be sufficient for establishing a magnitude greater than a take-up force otherwise available by the reel and power spring.

In operation, therefore, bushing 224 may be described as a safety port. For example, if a given length of cable external the housing is released during a cable retrieval process, the cable may sag under its own weight for contacting an edge of the bushing 224, e.g., at the entry or exit of the passage. Therefore, the weight of the cable external the housing may be understood to rest substantially on the edge of the bushing defining the passage for imparting a resistive force upon the cable related to both the weight of the cable and the coefficient of friction between the bushing and the cable. It may also be understood that further resistive forces may be imparted to the cable dependent upon a cantilever action of the cable relative a rear edge of the passage as defined by the bushing.

Further information regarding bushing 224 and cable 772 may be found in U.S. patent application Ser. No. 11/345,864, filed Feb. 1, 2006, and published under US patent publication number US-2006-0144101 of Jul. 6, 2006, the disclosure of which is hereby incorporated by reference in its entirety.

Figure 7A:
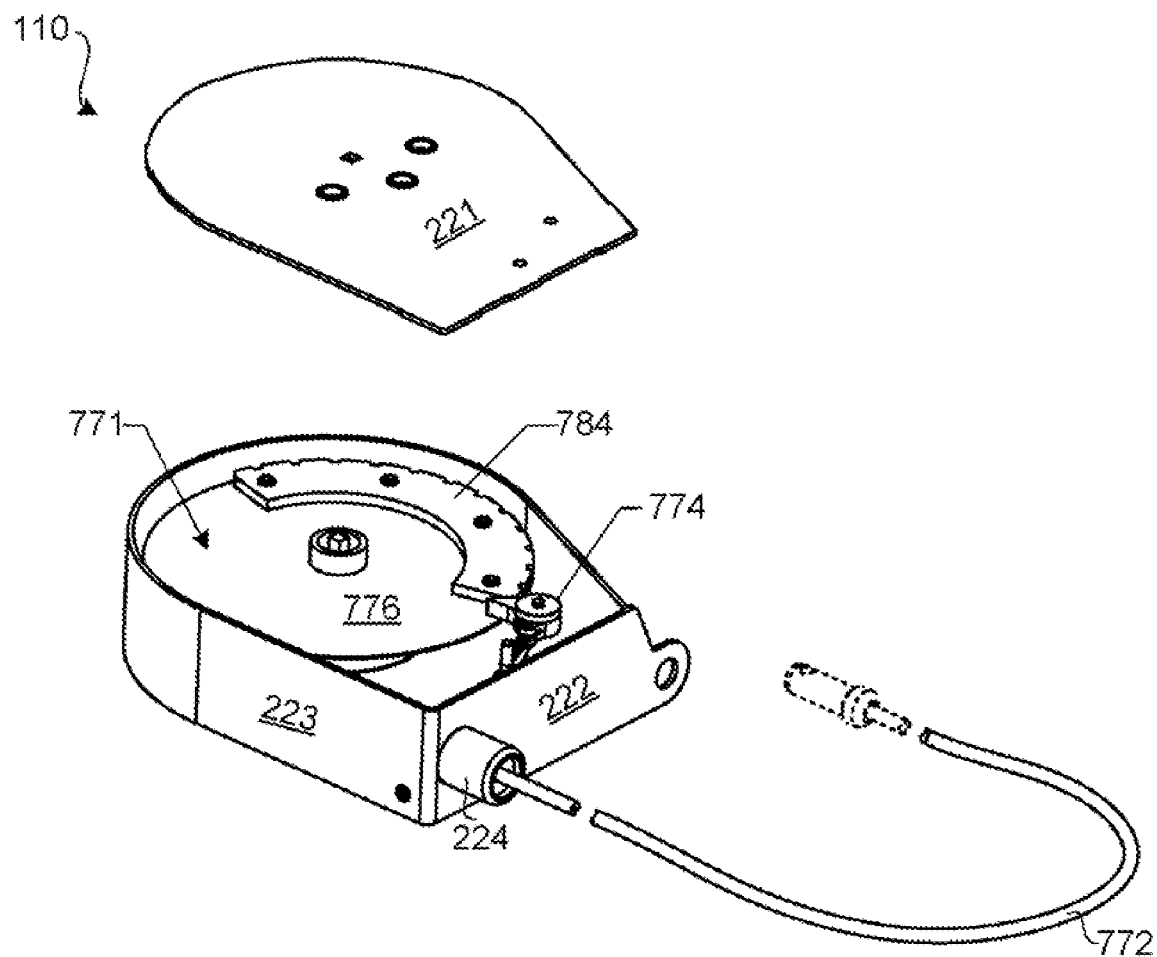
FIGS. 7A and 7B are simplified perspective and assembly views of the retractable cable securement sub-assembly for a toolbox, consistent with embodiments of the present invention, showing interrelationships of the cable reel and bushing with respect to the cable housing and also showing a cable retention knob.
Figure 7B:
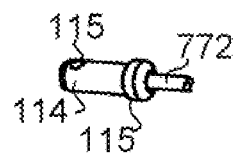

Moving forward with reference to FIG. 7B, the butt end of the cable retention knob 114 may comprise a profile that flares outwardly from where it joins the cable. The flare-out may extend radially outward toward an outer circumference for the butt-end. The butt-end may thus form a shoulder of an angled (e.g., 45 degrees) flare-out operable to fit in non-binding engagement with a comparable countersunk or angled (e.g., 45 degrees) contoured surface for the opening of hushing 224. In other words, when cable 772 is fully retracted for storage within the cable housing, the flared shoulder defined by the butt-end of the cable retention knob may be held (under the influence of the tension presented to the cable by the spring-loaded reel) against the counter-sunk surface associated with the opening of bushing 224.

Figure 7C:
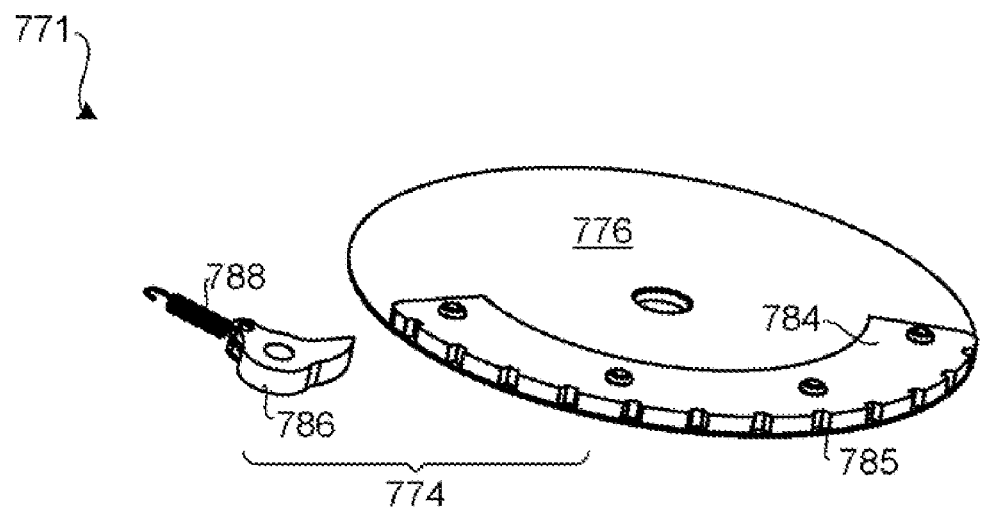
FIG. 7C is a simplified perspective and assembly view of the cable reel of FIG. 7A, which may be disposed within the cable housing to define at least part of a retractable cable securement sub-assembly, and also showing the reel, the core, the power spring and ratchet mechanism.
Figure 7C:
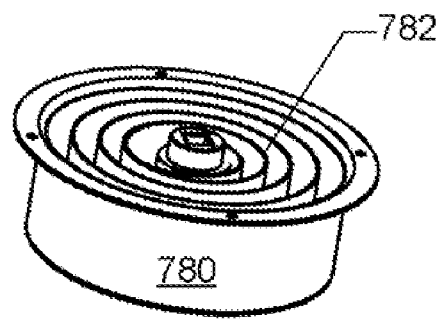
Figure 7C:
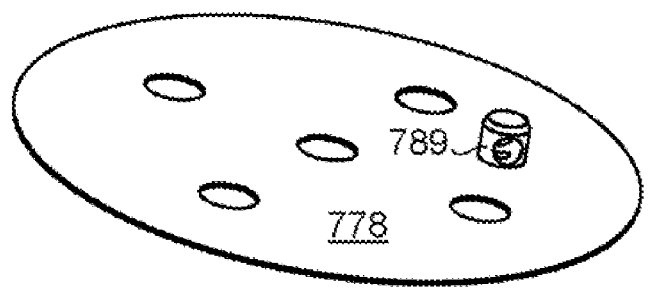

Further referencing FIGS. 7A and 7C, it may be understood that reel 771 may be secured within the cable housing for axially rotation therein. By rotation in one direction, the reel may be operable to retrieve the cable for storage. By rotation in an opposite direction, it may allow extraction or extension of the cable.

Further referencing FIG. 7C, upper plate flange 776 for the reel may comprise a ratchet mechanism 774 that may be operable to capture the reel and release tension on the cable at given lengths of cable 772 extraction. A ratchet lever 786 operable under bias by spring 788 may pivotally engage notches 785 of a ratchet gear 784 that is fixed relative to at least a portion of the circumference of the reel. As the cable is pulled outwardly, notches of the ratchet gear at given angular rotations of the reel may receive the catch-end of the ratchet lever 786. Accordingly, lever 786 may capture the reel. At larger increments of the reel, the ratchet lever may find a neutral zone across a second arc section of the reel as defined outside the arc-section of ratchet gear 784. In the neutral zone, the ratchet lever may find free clearance for enabling release of the reel, which in turn may enable spring-powered rewind of the cable.

In other words, the rotation of the reel may be reversed when it is rotationally positioned in the neutral zones; whereby, the ratchet gear may release the reel and a power spring 782 within the core 780 of the reel may act operably to drive retrieval of the cable from external the housing by winding it about the core of the reel. It may be understood that ratchet lever 786 and biasing spring 788 may be realized in other ratchet forms, while remaining collectively functional in cooperation with the reel for assisting incremental and retractable cable extension.

In a particular embodiment, the ratchet gear of ratchet 774 may be formed integrally with upper plate flange 776 of the reel. For example, the upper plate flange for the reel and the ratchet gear may be formed integrally as a single plastic component, e.g., by way of a plastic injection molding process. Alternatively, ratchet gear 784 may be formed as a separate component, which may then be, e.g., welded, stake welded, spot welded, compression welded, static welded, riveted, screwed or bolted for secured operable relationship with the upper plate flange 776 of the reel.

Reel assembly 771 may take various forms, e.g., in a particular embodiment with reference to FIG. 7C, it may comprise circular plates for the upper and lower flanges 776, 778. The upper and lower flanges may be inter-coupled for sandwiching core 780 therebetween. A power spring or a clock spring 782 may be disposed within core 780 and configured as known to apply a rotational bias for delivering a torque to the core about a central axis of the reel. This may be operable to allow tensioned rewinding and/or tensioned unwinding of the cable onto/from the circumference of the core.

Figure 8:
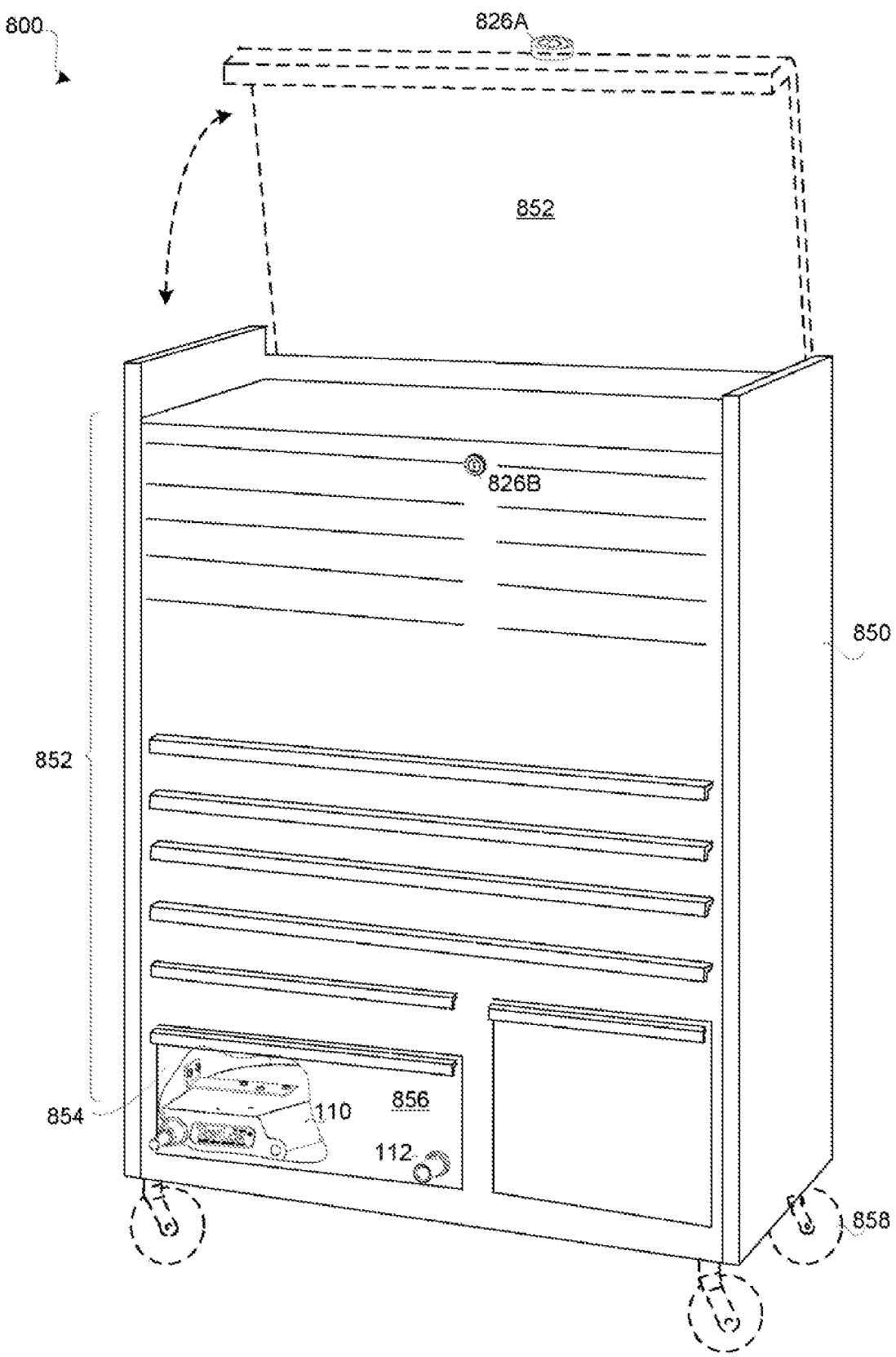
FIG. 8 is a simplified perspective view of a cabinet toolbox, consistent with embodiments of the present invention, showing a retractable cable securement sub-assembly within a drawer of the cabinet toolbox.

In accordance with a further embodiment of the present invention, referencing FIG. 8, toolbox 800 may be a cabinet style toolbox having a plurality of walls 850 that define a cabinet structure. In a particular embodiment, an upper lid 852 may be pivotally attached to a rear wall of the cabinet for enabling pivotal operation as a hinged lid for the cabinet. In an alternative embodiment, the upper wall may be of a fixed configuration. Additionally, a plurality of drawers may be configured for slidable operation relative to slots formed in association with the frame structure of the cabinet. A given drawer 854 of the cabinet toolbox 850 may be defined at least in part by front wall 856, which in turn may define an aperture therethrough.

A cable housing 220 of a retractable cable securement sub-assembly 110 may be fixed to at least one inside wall of the given drawer 854 for placement within the interior. The mounting may be similar to embodiments described previously relative to FIGS. 1-3.

Likewise, a hollowed knob securement member 112 may be fixed (e.g., threaded, captured, bolted or welded) to a portion of front wall 856. The hollowed securement member 112 may comprise a structure similar to those described previously relative to FIGS. 4-6. In illustrated embodiments, the hollowed securement member 112 is fixed to the front wall of the same drawer as that through which the cable may be threaded.

In alternative embodiments, the hollowed securement member 112 may be omitted or fixed to another portion of the cabinet toolbox.

Finally, it may be understood that the cabinet toolbox of some embodiments may comprise castors or wheels 858 as known for enabling ready transport of the cabinet toolbox within a garage or workshop. In other embodiments, the cabinet toolbox may be absent castors or wheels.

In accordance with a further embodiment of the present invention, referencing FIG. 14 relative to FIG. 1, storage box 1400 may comprise a plurality of walls. These walls may include sidewalls extending upwardly from a floor. The sidewalls may include, e.g., front and back sidewalls 102, left and right sidewalls 104. The plurality of walls may define an interior for the toolbox for storing tools or other implements. Lid 108 may be user operable for pivot or other type displacement for enabling the user access to the interior of the storage box.

In a particular embodiment, the plurality of walls may define the storage box 1400 with an external shape pre-determined to assist with its mounting into the back of a pick-up truck. Accordingly, extension walls 106 (shown in phantom lines) may define wing portions 1406L, 1406R that may provide left and right shoulders to the tool box to assist mounting or resting upon the sidewalls or rails in the bed of a pick-up truck. Alternatively, these optional wing portions 1406L, 1406R may not be present for more general storage or toolbox configurations.

Further referencing FIG. 14, lid 108 may generally be pivotally attached to a rear wall of the storage box 1400 for enabling hinged operation of the lid between open 1408A or closed 1408 positions as a user may selectively establish. In this particular embodiment, latch assembly 1000 may be disposed in operable proximity of receiving port 912 to enable latched capture of cable retention knob at an end of cable 772, when the lid of the storage box 1400 is closed and when the cable retention knob has been inserted into the receiving port 912.

For example, a user may extract cable 772 from a retractable cable sub-assembly 110 that has been operably positioned within the interior of the storage box 1400 to assist in the passage of the cable through exit aperture of bushing 224 defined through a wall 102 of the storage box. It may be understood that the exit aperture may be formed by a bushing 224 as described previously herein. Thus, a user may extract cable 772 from the exit aperture defined by bushing 224 and wrap it about external tools, equipment or other personal implements to be secured. The cable retention knob on the end of the extracted length of cable 772 may then be inserted into the receiving port 912 for latched capture by the latch assembly 1000 when the lid 108 of the storage box 1400 is closed.

In this embodiment, the latched capture operability of the latch assembly 1000 is made selectively operable dependent upon the position of lid 108 in the closed position. When the lid is opened away from the closed position, latch assembly 1000 is configured for release operability. Thus, when the lid is open, the release operability of latch assembly 1000 allows removal of the cable retention knob from the receiving port 912, Further referencing FIG. 14, when the lid 108 is closed and the cable retention knob at the end of the cable has been inserted into the receiving port 912 for latched capture by the latch assembly, the capture is sustained until the lid is again opened. Accordingly, while the lid is in the closed position 1408B with the cable retention knob captured in the receiving port by the latch assembly 1000, the user may then lock the lid closed using known lock provision such as 826B. Such lock provision may include known keyed locks, number tumbler locking devices or other known padlock or electronic type locking solutions.

Once the lid has been so secured, cable securement is likewise secured. In Other words, release of the cable retention knob from receiver port 912 would be dependent upon the user unlocking the locking provision that secures the lid in the closed position, whereupon the user might then be able to open the lid and thus release the latched capture of the cable retention knob.

In the embodiment of the storage box described above relative to FIG. 14, the position of the exit aperture 224 and the placement of the retractable cable sub-assembly 110 have been positioned proximate the upper right corner of the forward wall to the storage box. The receiving port 912 and latch assembly 1000 has been position for this embodiment proximate the upper left corner of the forward wall to the storage box. In alternative embodiment, these ports and associated assemblies could be positioned at alternative positions and/or walls of the storage box 1400.

However, if brake operability is desirable for the brake bushing for particular applications, then storage box 1400 may be selected with embodiments positioning brake bushing 224 at upper elevations of the sidewalls. Further, it may be understood that the placement of the latch assembly relative the lid may affect the length required for the rods that may be required for the actuation coupling between the latch and the lid.

In a particular embodiment, referencing FIGS. 9 and 10, a mechanical actuator such as plunging rod 993 may be displaced downward when lid 108 is positioned by a user for a closed configuration over the interior of the storage box. In one optional embodiment, further referencing FIG. 9, the displacement caused by closure of lid 108 may be adjusted by fixing a shim 999 of user selected thickness to an inner surface of lid 108. It may be understood that the downward displacement of plunging rod 993 may compress plunger lift spring 994 against a recessed cylindrical counterbore collar or step at the opening of bore 1001 and as defined by the block 991 for the alignment unit. Similarly, the downward displacement of plunging rod 993 will displace the latch pin 992 downward for positioning its latching pin or blade for a partial spring-biased interference into the path defined by an inner diameter of the receiving port 912. Accordingly, when the leading head 919 of the cable retention knob 914 is pressed against the latch pin during insertion by a user, the beveled contour profile of the head for the knob may be operable for displacing the latch pin longitudinally upward against a secondary spring bias of latch spring 995, which is held under compression between the plunger rod 993 and the stepped edge at the end of latch pin 992. In a particular embodiment, the spring constant of the latch spring 995 may be selected to be greater than that of the plunger lift spring 994.

It may be understood that the extent of downward movement of latch pin 992 may be set by the lower extent of the longitudinal slot 998 formed in the alignment unit 991 acting collectively with the stop pin 997 that extends laterally outward from the sidewalls of the latch pin 992. When stop pin 997 meets the lower extent of the longitudinal slot 998, any further displacement of the plunger rod may be understood to be accommodated by partial compression of latch spring 995.

Further referencing FIGS. 9 and 10, in this embodiment, the placement of the alignment unit relative to the path defined by receiver port 912 may be established by the relative predefined placement and securement of alignment unit 991 to the mount plate 990. Mount plate 990 is predefined with an aperture through which the bushing for the receiver port is to be inserted and seated. Accordingly, during assembly, the relative placement for the latch pin may be defined reasonably consistently for assisting reliability for the longitudinal latch capture operation of the latch assembly 1000.

It may be understood that the alignment unit 991 of a block and/or bracket type structure associated with mount plate 990 may be fastened together using known means and likewise may be secured to the front wall 102 using similarly known mechanical securement means such as, e.g., glue, welds, bolt/nut or c-clip capture of the receiving port bushing or grommet extended through the aperture of front wall 102 and mounting plate 990.

During assembly, the plunger lift spring 994 may be positioned within a counterbore or recessed step portion defined in the periphery at the entry of bore 1001 in the block; 991 for the alignment unit. Latch pin 992 may be slid into the bore 1001 until a hole on the sidewall along the longitudinal length of the latch pin reveals itself through a longitudinal slot 998 of the alignment unit 991. In a further embodiment, alignment ribs (not shown) may be formed on the latch pin sidewall to assist an aligned insertion of the latch pin into a similarly keyed circumference of bore 1001.

Further referencing FIG. 10, once the hole for receiving the stop pin is sighted through the slot 998 of the alignment unit 991, an assembler may then position stop pin 997 into the exposed hole of the latch pin for fixing thereto. Accordingly, it may be understood that the laterally projecting stop pin 997 from the sidewall of latch pin 992 may operable in combination with the longitudinal extent of the slot 998 defined by the alignment unit 991 to limit the longitudinal movement of the latch pin and likewise to restrict its rotational movement within bore 1001.

Further describing the assembly, with reference to FIG. 10, latch pin 992 may be fastened to the lower end of plunging rod 993 by way of the linkage screw 996 and with the latch spring 995 held in compression between the plunging rod 993 and the latch pin 992. Referencing the cross-sectional view of FIG. 11B, the plunging rod 993 may be described as having first and second hollows on opposite sides of an intermediate barrier wall therebetween.

The lower or first hollow may receive the latch spring and hold the latch spring against the stepped end of the latch pin 992. The linkage screw 996 may be understood to thread into the tapped opening at the end of latch pin 992 for securement thereto while passing through an axial passage that is defined through the barrier wall. Accordingly, the linkage screw may be described as retaining the plunging rod over the end of the latch pin 992 as an operable cap. In an alternative description, the lower hollow of the plunger rod 993 may be defined as a coaxial cup of diameter suitable for coaxially guided fit over the end of the latch pin 992. As thus assembled, the linkage screw 996 retains the plunging rod 993 to the end of latch pin 992 with the latch spring 995 in compression.

When the lid of the storage box is open, further referencing FIGS. 9, 10, 11A and 11B, the plunger lift spring 994 may be operable against a lower lip of the plunging rod 993 so as to lift the plunging rod together with the latch pin 992 as an overall longitudinal assembly away or upwardly from the receiver port. This upper displacement may be limited by the slot 998 acting cooperatively with the stop pin 997. In some embodiments, the overall assembly may be defined for enabling a slight compression or bias of plunger lift spring 994 against the collar or lip of the plunger rod 993 when the stop pin 997 of the latch pin 992 is pressed against the upper limit of the longitudinal slot 998 as defined in the alignment unit 991. It may be also understood that the amount of displacement that would be assembled for the plunger lift spring 994 could similarly be affected by the amount that linkage screw 996 is threaded into the threaded end of latch pin 992. This threaded engagement of the linkage screw 996, through axial passage of the barrier wall of the plunger rod 993 against the bias of latch spring 995, to the threaded securement end of latch pin 992 might also be utilized to affect a vertical displacement adjustment for the assembly relative to an inner surface of lid 108. The vertical adjustment may assure that when the lid 108 is placed in the closed position, the plunging rod 993 will receive a sufficient longitudinal displacement (downward) to enable stop pin 997 of latch pin 992 to be pressed against the lower extent of the longitudinal slot 998 of alignment unit 991.

In operation, to assist further understanding of embodiments of this invention, the latch to lid operability dependence may be described with reference to FIGS. 11A, 11B, 12A-12B, and 13A-13B.

Figure 11A:
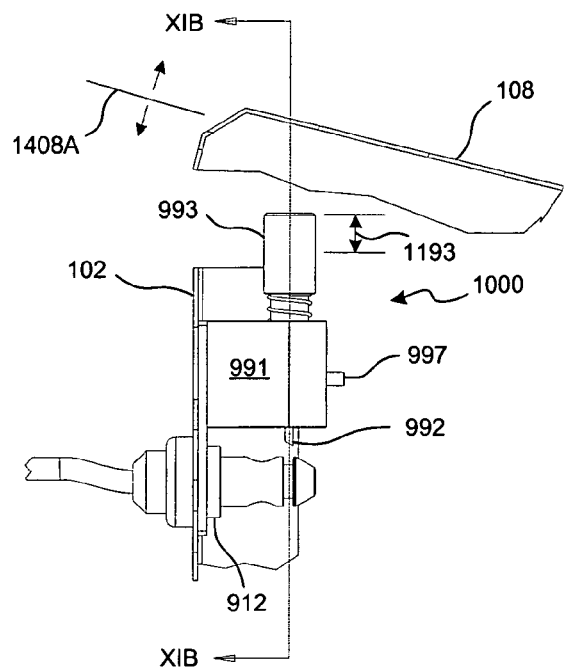
FIGS. 11A and 11B are simplified side and cross-section cut away views of a latch assembly in a storage box, in accordance with an embodiment of the present invention, showing an operability of the latch when the lid in an open condition.
Figure 11B:
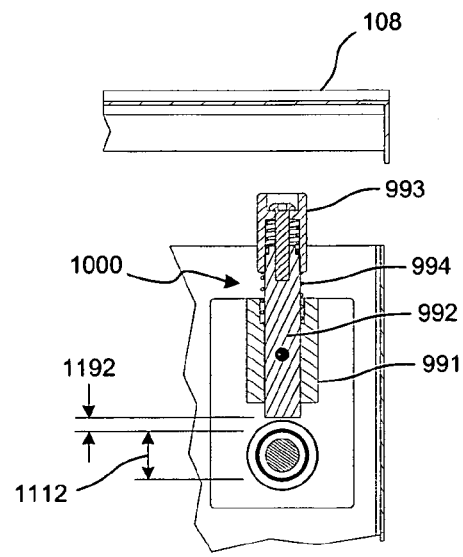

When the lid is open, referencing FIGS. 11A and 11B, the lower surface of lid is clear of plunging rod 993. Plunging rod may be positioned upward by plunger lift spring 994. The extent of this upward displacement may be limited by the stop pin 997 acting against the upper limit of the slot 998 in alignment unit 991. With this upward vertical position of the actuator latch pin assembly, the blade of latch pin 992 may be held with clearance 1192 from the path defined by the inner diameter of receiving port 912. Accordingly, a cable retention knob may be removed from the receiving port. This may be described as the latch assembly 1000 being configured for release operability when the lid is in the open position.

Figure 12A:
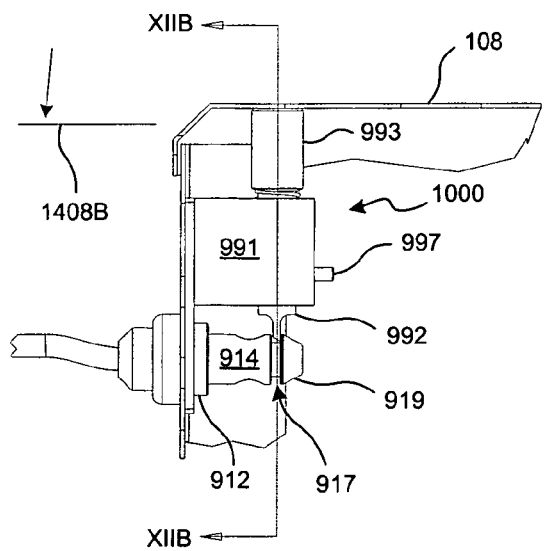
FIGS. 12A and 12B are simplified side and cross-sectional cutaway views of a latch assembly in a storage box, in accordance with an embodiment of the present invention, showing an operability of the latch when the lid in a closed condition.
Figure 12B:
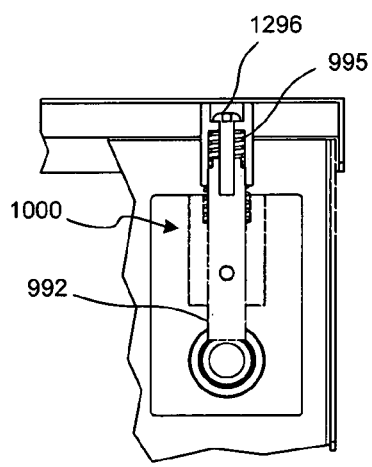

Moving forward with reference to FIGS. 12A and 12B, when the lid 108 has been moved by a user into the closed position 1408B, the Inner surface of lid 108 may press against the top of plunging rod 993 so as to displace (1193 per FIG. 11A)the actuator latch pin assembly downward until the stop pin 997 meets the bottom limit of the slot 998 as defined in the sidewall of the alignment unit for bore 1001. Accordingly, when the cable retention knob 914 has been inserted into the receiver port 912, the butt-end 913 (referencing FIG. 10) of the cable retention knob may seat against the collar or flange at the outer portion of the receiving port 912. The groove 917 defined near the distal end of the cable retention knob may receive the latch blade of the latch pin 992 for latched capture. When the latch pin or blade springs into this groove, it will serve to hold the cable retention knob within the receiver port until such time that the lid of the storage box is opened for enabling the release of the latch pin.

Referencing FIG. 12B, it may understood that the bias asserted to latch pin 992 may be established by latch spring 995 as held in position between the end of latch pin 992 and the barrier wall within plunging rod 993. The amount of compression of latch spring 995 would be established by the longitudinal extent of linkage screw 996, wherein the screw head 1296 is stopped against the upper surface of the barrier wall.

Referencing FIGS. 13A-13B, relative to FIGS. 12A-12B, it may be understood that the biased operation of the latch pin 992 is facilitated by the clearance of the upper hollow above the barrier wall in plunging rod 993 of hollowed diameter greater the diameter of screwhead 1296. Accordingly, as the head 919 of the cable retention knob is inserted into the receiver port, eventually the beveled lead surface of the head 919 makes contact with the latch pin or blade 992. As the knob is further inserted, the beveled profile of the head 919 displaces latch pin 992 for an upward vertical displacement against the bias of the latch spring 995. When so displaced against the beveled edge of head 919 of the cable retention knob, it may be understood that the vertical displacement may lift the screw head 1296 of the linkage screw upward by a vertical displacement 1396 corresponding to that lent by the leading head 919 of the cable retention knob. Once the knob is extended further, latch pin 992 will then spring into groove 917 to capture the knob under the bias influence of latch spring 995.

In a particular embodiment, to assist the biased longitudinal movement of latch pin 992, it may be understood that the axial via in the barrier wall between the upper and lower hollows in the plunging rod 993 may have a width just greater than the diameter of the shaft to the linkage screw 996. With this nominal clearence, the lateral play of the shaft relative to the passage may be limited.

In the embodiment described above, the extent of the longitudinal displacement of the latch assembly was limited dependent on the longitudinal length of slot 998 formed in the block, of alignment unit 991 acting cooperatively with stop pin 997 that extends laterally outward from the sidewalls of latch pin 992. In an alternative embodiment, not shown, a groove of limited longitudinal extent may be formed in a portion of sidewalls of the latch pin. A set bolt of a standard bolt, screw or pin may be driven through a wall of the alignment unit for extending at least partially into the slot defined in the side of the latch pin. The set bolt might then be collectively operable with the groove so as to limit the longitudinal extent of the latch pin and restrict its rotational movement within the bore.

The various embodiments as described above are provided by way of illustration only and should not be construed to limit the invention. Based on the above discussion and illustrations, those skilled in the art may readily recognize that various modifications and changes may be made to the present invention without strictly following the exemplary embodiments and applications as illustrated and described herein. Such modifications and changes do not depart from the true spirit and scope of the present invention as may be set forth in the following claims.

What is claimed is:

1. A storage box comprising:
    a plurality of walls defining at least in part an interior for storage, at least one of the plurality of walls of the plurality defining an exit aperture and a receiving port;
    a reel disposed within the interior operable for axial rotation;
    a cable having a first end secured to the reel and a second end opposite the first end;
    the reel operatively positioned relative the exit aperture to enable the cable passage through the exit aperture;
    a cable retention knob fixed to the second end of the cable;
    a lid operatively configured for open-close placement relative to the plurality of walls for the interior; and
    a latch assembly disposed in proximity to the receiving port, the latch assembly selectively operable dependent on the open or closed placement of the lid to enable release or operable spring biased capture respectively of the cable retention knob when the cable retention knob is in the receiving port.

2. The storage box of claim 1, wherein the latch assembly comprises:
    an actuator; and
    a spring-biased latch pin or blade;
    the actuator operatively configured to be selectively operable upon the spring-biased latch pin or blade dependent on the open or closed placement of the lid, the actuator to configure the spring-biased latch pin or blade for spring-biased capture operability when the lid is closed and for release when the lid is open.

3. The storage box of claim 2, in which the actuator comprises:
a plunging rod operable with a downward relative longitudinal displacement, when the lid is closed, sufficient to position at least a portion of the spring-biased latch pin or blade for partial spring-biased interference within the path defined by the inner-diameter of the receiving port; and
a plunger lift spring operatively configured to mechanically bias the plunging rod when the plunging rod has been displaced downward with a lift force operable to lift the plunging rod when the lid is opened, and with a lift displacement sufficient to clear the spring-biased latch pin or blade from the path defined by the inner-diameter of the receiving port.

4. The storage box of claim 3, in which the spring-biased latch pin or blade comprises:
a latch pin or blade operatively disposed in substantially longitudinal and axial relationship to an end of the plunging rod, the latch pin or blade to be longitudinally movable in operable proximity to the receiving port; and
a latch spring operatively configured to apply a spring-bias between the plunging rod and the latch pin or blade.

5. The storage box of claim 4, in which the latch assembly further comprises:
a linkage screw having a fastening portion secured to an end of the latch pin or blade that is opposite its engagement capturing end;
the linkage screw having a longitudinal length terminating at a screw-head;
the plunging rod defining first and second hollows with a barrier wall therebetween;
the barrier wall defining an axial passage communicating between the first and the second hollows;
the axial passage of the barrier wall having a diameter sufficiently great to permit clearance of at least a portion of the longitudinal length of the linkage-screw for enabling its longitudinal passage therethrough, the diameter of the axial passage through the barrier wall less than that of the screw-head; and
the latch spring disposed coaxially around a longitudinal portion of the linkage screw and in compression between the barrier wall of the plunging rod and the end of the latch pin or blade.

6. The storage box of claim 5, in which the first hollow of the plunging rod forms a cup or cap with diameter operable to enable coaxially guided receipt of the end of the latch pin or blade; and
the second hollow of the plunging rod has a diameter greater than that of the screw-head.

7. The storage box of claim 6, further comprising an alignment unit fixed to at least one of the walls of the plurality of walls, the alignment unit to enable longitudinally guided movement of the latch pin in aft proximity to the receiver port.

8. The storage box of claim 7, wherein the alignment unit comprises:
at least one of a block and bracket fixed to said at least one of the walls of the plurality of walls, and
the at least one of the block and bracket defines a bore that coaxially and operatively receives the latch pin or blade for longitudinal guided movability therein.

9. The storage box of claim 8, wherein
the latch pin or blade further comprises a stop pin that extends radially outward from a longitudinal sidewall of the latch pin or blade;
the walls of the at least one of the block and bracket for the alignment unit that are associated with defining the bore, further defining at least one of a recess, groove or slot as a longitudinal slot of limited longitudinal extent along a partial longitudinal length of the walls that define the bore;
the stop pin slotted into the longitudinal slot;
the stop pin collectively operable with the longitudinal slot to limit longitudinal movement of the latch pin or blade within the bore and to restrict its rotational displacement.

10. The storage box of claim 8, wherein the cable retention knob comprises:
a butt-end that joins the second end of the cable, and
a substantially cylindrical shaft that extends longitudinally outward from the butt-end opposite the cable;
wherein the substantially cylindrical shaft includes a coaxial retention groove formed around its circumference near the distal end to define a head, the retention groove to enable operable receipt of the latch pin or blade of the spring-biased latch pin or blade for capture of the head when the head is inserted into the receiving port.

11. The storage box of claim 10, in which an entry portion of the head of the cable retention knob is beveled to define an entry contour, the spring-bias of the latch spring is sufficiently light to enable user operable insertion of the head of the cable retention knob through the path aft the passage of the receiving port, wherein the latch pin or blade is operable for displacement radially outward the path as caused by the beveled contour of the head when it passes through the path aft the passage of the receiving port.

12. The storage box of claim 10, in which the magnitude of the biased displacement when the lid is closed is sufficient to displace and position at least a portion of the spring-biased latch pin or blade into at least a partial diameter of the path defined by the inner-diameter of the receiving port to enable the spring-biased latch pin or blade operability for spring-biased capture of the cable retention knob when the cable retention knob is inserted into the receiving port.

13. The storage box of claim 3, in which the lid is pivotally mounted to one of the walls of the plurality, and comprises an inwardly facing surface operable to press against the plunging rod for biased displacement of the plunging lift spring when the lid is closed; the storage box further comprising locking provision to enable user operable locking of the lid when the lid is closed for securing the lid in the closed position.

14. A toolbox comprising:
a plurality of walls defining at least in part an interior for storage of tools;
a lid operable for open-close movement relative to the plurality of walls to enable user access to the interior;
a cable housing disposed within the interior;
a reel operatively secured for axial rotation within the cable housing;
a cable having a first end secured to the reel and a second end opposite the first end;
a cable retention knob fixed to the second end of the cable;
the cable housing fixed to at least one of the walls of the plurality to enable operable passage of the cable through an exit aperture defined by at least one of the plurality of walls for the interior;

a spring configured to apply a rotational force to the reel to tension the cable when winding/unwinding the cable onto/from the reel;

a receiving port defined by the at least one wall of the plurality of walls, the receiving port operable to receive at least a portion of the cable retention knob; and a latch assembly operatively disposed in proximity to the receiving port;

the latch assembly selectively operable dependent upon the open or close position of the lid, wherein the latch assembly is selectively configured to release the cable retention knob when the lid is open and to enable spring-biased capture of the cable retention knob when the lid is closed and when the cable retention knob is seated within the receiving port.

15. The toolbox of claim 14, further comprising a bushing disposed through the at least one of the walls of the plurality of walls to define a passage for the receiving port.

16. The toolbox of claim 15, wherein the latch assembly comprises a spring-biased latch-pin or blade operatively disposed for select and removable placement into a partial diameter of a path that is defined aft the passage of the bushing when the lid is closed to enable the spring-biased capture of the cable retention knob when it is inserted into the passage defined by the bushing.

17. The toolbox of claim 14, in which the plurality of walls define at least in part an external shape predetermined to assist installation of the toolbox to a pickup truck.

18. A toolbox comprising:

a plurality of walls defining at least in part an interior for storage of tools;

a lid operable for hinged open-close movement relative to at least one of the walls of the plurality to enable user selective access to the interior;

a retractable cable sub-assembly disposed within the interior, the retractable cable sub-assembly comprising a rotationally spring-biased reel operable to tension a cable when winding/unwinding the cable onto/from the reel;

a cable retention knob fixed to an end of the cable opposite the reel;

an exit aperture defined through a wall of the plurality of walls and operatively disposed to enable passage of the cable therethrough when extracting or rewinding the cable from or to the reel;

a receiving port defined through at least one wall of the plurality of walls, operable to receive at least a portion of the cable retention knob; and a latch assembly disposed in operable proximity to the receiving port;

an actuator operatively configured to be operable dependent upon the open or close position of the lid to selectively configure the latch assembly for an operability of release when the lid is open or an operability of capture when the lid is closed for enabling capture of the cable retention knob when the cable retention knob is inserted into the receiving port.

19. The toolbox of claim 18, wherein the latch assembly comprises a spring-biased latch-pin or blade removably disposed, when the lid is closed, into a partial diameter of a path that is defined by an inner-diameter of the receiving port to enable a spring-biased capture of at least a portion of the cable retention knob by the spring-biased latch-pin or blade when it is inserted into the receiving port.

20. The toolbox of claim 18, in which the actuator comprises a plunging rod operatively disposed in a physical path between the lid and the latch assembly;

wherein the plunging rod is operatively disposed for movable and recoverable downward (relative) displacement against a recoverable spring-bias when the lid is closed, the spring-biased latch pin or blade is operatively configured to be sufficiently responsive to such downward displacement of the plunging rod for being positioned into the partial diameter of the path that is defined by an inner-diameter of the receiving port; and the plunging rod is further operatively configured for movable upward displacement under the influence of a recovering spring bias when the lid is opened from its closed position, the available upward displacement of the plunging rod sufficient to withdraw the latch-pin or blade from the path that is defined by the inner-diameter of the receiving port.

* * * * *